Patented July 15, 1941

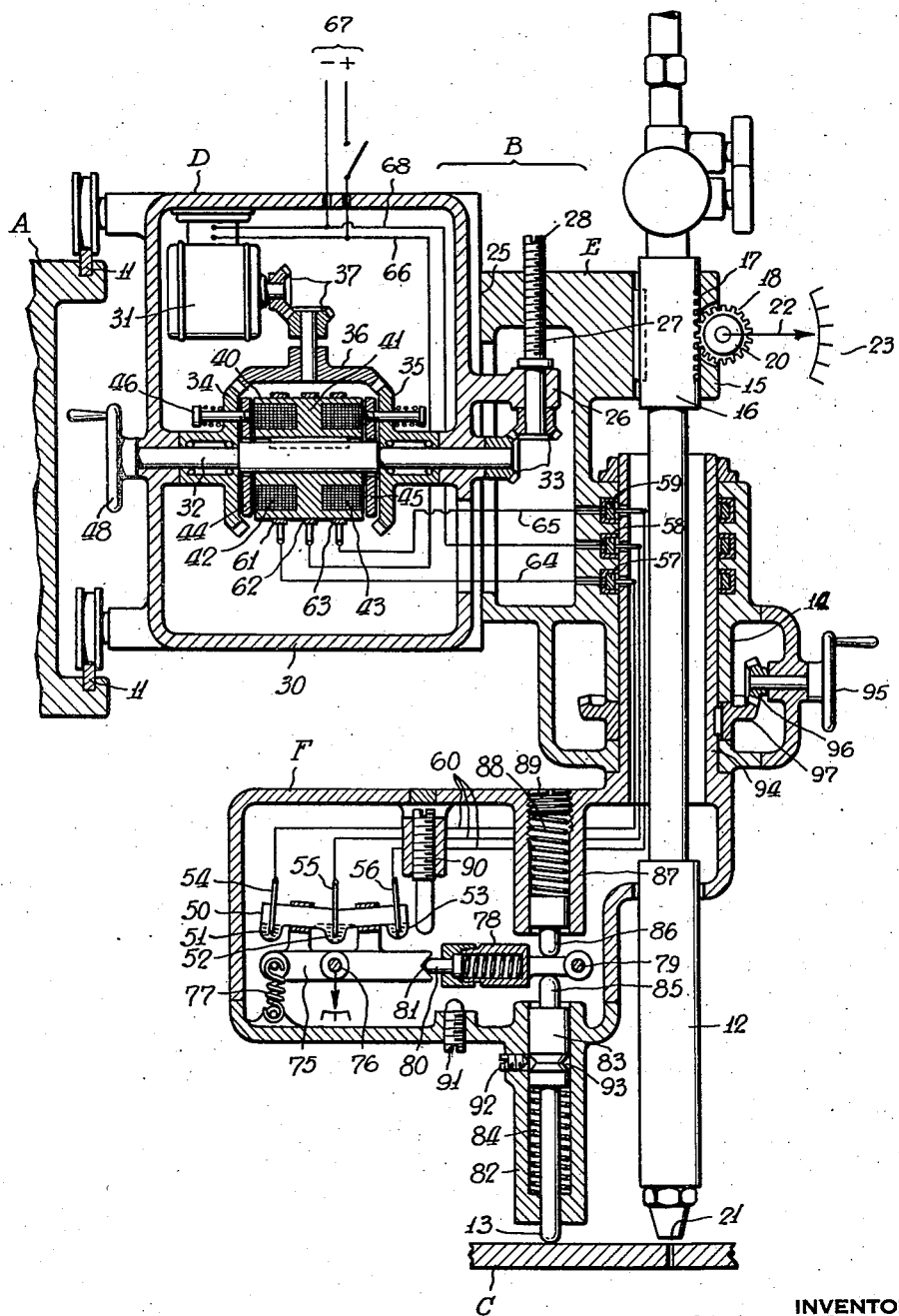

2,249,413

UNITED STATES PATENT OFFICE 2,249,413

CUTTING TORCH

Richard Bechtle and Erich Habermehl, Frankfort-on-the-Main, Germany, assignors to Messer & Company, G. m. b. H., Frankfort-on-the-Main, Germany, a company of Germany Application November 27, 1939, Serial No. 306,324
In Germany November 29, 1938

10 Claims. (Cl. 266—23)

In order to make clean oxy-acetylene cuts, the blowpipe must be held at a constant distance from the surface of the work piece or sheet throughout the cutting operation. This distance must be adjusted before starting, in accordance with the nature of the fuel gas and the thickness of the material being cut. For small work pieces, this distance is generally controlled by hand. For the large work sheets, it is necessary in most cases to readjust the distance, because these sheets often get warped during the cutting process, and consequently present an undulated surface to the cutting flame. Furthermore, it is difficult to set a large work sheet into true horizontal position throughout its area, and very frequently the sheets are not in a true plane even before being placed in position.

Constant manual readjustment has many disadvantages. For instance, if the area of the sheet be large, it is sometimes almost impossible to reach the blowpipe by hand while cutting. Furthermore, it is very trying for the eyes of the welder to watch the flame continuously.

The known devices for the automatic adjustment of the height of the cutter are not satisfactory. Most of them are fitted with supports which are pushed over the surface of the work by the machine and which carry the weight of the cutter, the carriage and the gas supply hose. Such devices do not operate properly if the surface of the work piece is rough as is often the case, and if the blowpipe cutting machine has only moderate feeding or traction power as is also generally the case.

Adjusting the height of the blowpipe by means of gauges similar to those used in copy milling machines has not been satisfactory, as such gauges are not suitable for the purpose of the present invention.

As a feature of the present invention, there is provided a gauge, which automatically maintains the torch tip at a constant adjusted distance from the work piece during cutting operations, and which glides lightly over the surface of the work without carrying the weight of the torch, the carriage and the hose. Any changes in the height of the gauge resulting from roughness or irregularities on the surface of the work piece are automatically transferred by relatively small power to the device controlling the adjustment of the torch. As far as certain aspects of the invention are concerned, mechanical, hydraulic, pneumatic or electric power may be used for transmitting the action of the gauge to the torch.

If the gauge should slip off the work piece, due to inattentiveness of the operator, the torch might be pressed against the work and damaged. As another feature of the invention, there is provided means whereby if the gauge moves outwardly beyond a predetermined limit, the torch will be automatically moved away from the work piece, thereby avoiding damage to said torch.

Other features and advantages of the present invention will be apparent from the following particular description, and from an inspection of the accompanying drawing, showing the gauge control means of a cutting apparatus embodying the present invention, part of said means being in vertical section, part in elevation and part diagrammatic.

The gauge control means of the present invention is shown applied to that type of flame cutting apparatus, in which a carriage A, movable along tracks (not shown), supports a second torch carrying carriage B, movable along tracks 11 in a direction transverse to the direction of movement of said carriage A. Thus the desired universal cutting movement of an upright torch or blowpipe 12 over said work piece may be obtained in the usual or any desired manner.

In the specific form of the invention shown, the carriage B includes a frame section D, supported on and movable along the carriage A, and a frame section E, vertically adjustable with respect to said frame section D, and carrying the torch 12, and a caliper or gauge rod 13 adjacent to the torch 12, and adapted to glide over the surface of the work sheet C. The gauge rod or caliper is connected to supporting section E by means of a frame section F, mounted for rotatable movement with respect to the torch as will be hereinafter described.

The torch 12 passes loosely through a tubular bracket 14 on the frame section F, and through a slide bearing 15 of the carriage section E, and is mounted for lengthwise adjustment therein. Vertical adjustment of the torch is obtained by a sleeve 16 on the torch, splined in the bearing 15 for slidable movement therein, and having rack teeth 17 on one side thereof meshing with a gear 18 which may be rotated by means of a knob 20. The adjusted height of the torch tip 21 with respect to the work piece surface over which the gauge rod 13 glides during cutting operations may be indicated by a pointer 22, connected to the knob 20, and movable over a scale 23, calibrated to indicate the distance between said torch tip and the outer end of the gauge rod 13 in neutral position.

As the gauge rod 13 is moved axilly in accordance with the irregularities in the surface of the work sheet C, this movement is transmitted to the carriage section E to cause corresponding vertical movement thereof with respect to the carriage section D. For this purpose, the carriage section E has a vertical slide connection 25 for instance of dovetail design with the carriage section D. The carriage section D has rigid therewith an arm 26, in which is journalled a vertical shaft 27, a portion 28 of which is in the form of a feed screw for threaded engagement with the carriage section E. As this shaft 27 is rotated, the carriage section E is moved upwardly or downwardly according to the direction of rotation of said shaft.

The means for driving the shaft 27, and for controlling its direction of rotation is desirably enclosed in a housing 30 forming part of the carriage section D, and includes an electric motor 31 and a reverse transmission gearing between said motor and said shaft. In the specific form shown, this transmission gearing includes a shaft 32, extending through the housing 30, and a pair of coaxial bevelled gears 34 and 35, mounted loosely on said shaft and both meshing with an intermediate bevelled gear 36, driven from the motor 31 through a pair of intermeshing gears 37. This shaft 32 has a drive connection with the shaft 27 through a pair of intermeshing gears 33.

Between the two bevelled gears 34 and 35 and the shaft 32 is an electro-magnetic reversing coupling for coupling either one of said gears to said shaft. This coupling comprises an electro-magnet 40 having a magnetizable core 41 keyed to the shaft 32 for rotation therewith, and carrying two opposed coils 42 and 43 to form two electro-magnetic parts at opposite ends thereof. Between the bevelled gear 34 and the adjacent end of the electro-magnet 40 is a coupling plate 44 of magnetizable material such as soft iron slidably mounted on the shaft 32, and between the bevelled gear 35 and the other end of the electro-magnet 40 is a similar slidable coupling plate 45. These coupling plates 44 and 45 are secured to the bevelled gears 34 and 35 respectively for rotation therewith by means of rods 46, affixed to said plates and passing loosely thorugh the corresponding bevelled gears 34 and 35. Three of such rods 46 equally spaced circumferentially are desirably provided for each coupling plate, and are desirably spring pressed to urge said plates axially from the adjacent pole ends of the magnet 40 as shown in the drawing.

In the operation of the reverse transmission gearing, when for instance the coil 42 is energized, the coupling plate 44 will be magnetically attracted into coupling engagement with the adjacent pole face of the magnet 40, so that the bevelled gear 34 will be coupled for rotation with said magnet. In this position of the coupling plate 44, the drive from the motor 31 to the shaft 27 will be through the gears 37, bevelled gears 36 and 34, electro-magnet 40 and to the shaft 32 to rotate said latter shaft in one direction. With this transmission, the coil 43 will be deenergized, so that the bevelled gear 35 will rotate loosely about the shaft 32.

When the current is switched over to energize the coil 43 and deenergize the coil 42, then the plate 45 will be attracted into coupling engagement with the adjacent pole end of the magnet 40. This will couple the bevelled gear 35 to the electro-magnet 40, while the coupling plate 44 is spring pressed out of coupling engagement with the said magnet, so that the drive will be through the bevelled gears 36, 35 to the electro-magnet 40 and then to the shaft 32, to rotate said shaft in an opposite direction from that previously referred to. The direction of rotation of the shaft 32 determines the direction of rotation of the shaft 27, and in turn determines the vertical direction of movement of the carriage section E and the torch 12 supported thereon.

When the gears 34 and 35 are uncoupled from the electro-magnet 40, the shaft 32 may be rotated manually independently of said gears by means of a suitable hand wheel 48, affixed to said shaft 32, to move the torch supporting carriage section E vertically.

The respective electric circuits of the two coils 42 and 43 are controlled from the gauge rod 13 in accordance with the axial movement thereof. For that purpose, the control means between the gauge rod 13 and the electro-magnetic reversing coupling includes a three-point magnetic rock switch 50 having three terminal mercury wells 51, 52 and 53 into which extend electrodes or terminals 54, 55 and 56 respectively. These electrodes 54, 55 and 56 have electric connection by means of the leads 60 to three slip rings 57, 58 and 59 respectively mounted on the tubular bracket 14. Encircling the electro-magnet 40 are three slip rings 61, 62 and 63. The slip ring 61 is connected to one terminal of the coil 42, the other terminal being connected to the slip ring 62, and has an electrical connection with the slip ring 57 through a lead 64. The slip ring 59 is connected to one terminal of the coil 43, the other terminal being connected to the slip ring 62, and has an electrical connection with the slip ring 63 through a lead 65. The slip ring 62 which is connected to the terminals of both coils 42 and 43 is connected by a lead 66 to one side of a power line 67, the other side of the power line being electrically connected to the slip ring 58 through a lead 68. This power line 67 also feeds the motor 31.

It is seen that the two circuits of the coils 42 and 43 are connected together in parallel, and connected in parallel to the motor circuit, and these coil circuits are opened or closed by operation of the switch 50.

The counter-clockwise tilting of the switch 50 will electrically connect the two electrodes 54 and 55, and close the circuit of the electro-magnet coil 42, thereby causing rotation of the shaft 32 in one direction. If the switch 50 is rocked in a clockwise direction, the two electrodes 55 and 56 will be electrically connected, the coil 43 energized, and the circuit of coil 42 opened, so that the shaft 32 is rotated in an opposite direction.

The switch 50 is rocked in accordance with the vertical movement of the gauge rod 13 to effect the desired operation of the electro-magnet 40. For that purpose, the transmission between the switch 50 and the gauge rod 13 comprises a lever 75, supporting the switch 50, and pivotally mounted at 76 directly below the middle mercury well 52. This lever 75 is urged in a counter-clockwise direction about its pivotal support 76 by means of a spring 77 near one end, and at its other end has a pawl engagement with a lever 78 pivotally supported at 79. This pawl connection is effected by means of spring loaded pawl 80, extending into a V-shaped recess 81 at the free end of the lever 75.

The gauge rod 13 extends through a tubular housing 82, and has a plunger 83 in slide engagement therein. Between the plunger 83 and the bottom wall of the housing 82 is a coil spring 84 urging the gauge rod 13 upwardly. The upper end of the plunger 83 has a thrust piece 85 engaging the underside of the lever 78. Pressing downwardly against the upper side of the lever 78 in opposition to the thrust piece 85 is a thrust piece 86, slidable in a housing 87, and loaded by a spring 88, the tension of which may be adjusted by means of a screw 89.

On the upper side of the lever 75 is an adjustable stop 90 for limiting the counter-clockwise angular movement of said lever, and on the under side of the lever 78 is an adjustable stop 91 for limiting the counter-clockwise angular movement of the lever 78.

The neutral position of the gauge rod 13, with both circuits of the coils 42 and 43 opened, is determined by a set screw 92 when threaded into a groove 93 on the plunger 83.

In order to assure that the gauge rod 13 is constantly in engagement with the work surface during cutting operations, said rod is rotatable about the axis of the torch 12. This rotatable mounting of the torch 12 is particularly important in cutting work sheets which are narrower than the distance between the gauge rod 13 and the torch 12. To provide for this rotation of the rod 13 about the torch 12, the carriage section F has an upright hollow shaft 94, journalled in the bracket 14 of the carriage section E. The rotation of the carriage section F about the axis of the torch 12 is effected by means of a hand-wheel 95 driving a pair of intermeshing gears 96 and 97, one of which is keyed to the hollow shaft 94.

Although the operation of the device is believed to be apparent from the foregoing description, it is herein briefly summarized.

The gauge rod 13 is first put into neutral position by turning the set screw 92 into the groove 93, while the carriage section E is in elevated position. The proper distance between the torch 12 and the work surface is determined from tables or charts, and the knob 20 set to this distance on the scale 23. Then the switch to the power 67 is closed to start the motor 31, and the carriage section E is lowered by operation of the hand wheel 48 to bring the torch 12 in the neighborhood of the work surface. The set screw 92 is then loosened, to permit the gauge rod 13 to move downwardly into engagement with the work surface. This downward movement will rock the switch 50 clockwise, and close the circuit of the coil 43, so that the shaft 32 will rotate in a direction to bring the carriage section E downwardly. As soon as the gauge rod 13 reaches a neutral position, in which switch 50 is horizontal and the circuits of both coils 42 and 43 opened, the distance between the torch tip and the work surface will have the dimension adjusted on the scale 23, as shown in the drawing.

With this setting of the torch 12, the apparatus is started to move said torch over the work sheet to cut. During this cutting movement, if the gauge rod 13 should pass over an elevated surface, the rod would rise in its housing 82 and cause clockwise movement of the lever 78. This movement, transferred to the switch 50, tilts said switch counter-clockwise, so that the circuit of the coil 42 is closed. This couples the gear 34 to the electro-magnet 40, and causes rotation of the shaft 27 in a direction to cause upward movement of the carriage section E, and in turn of the torch 12 and the carriage section F. During this upward movement of the torch 12, the gauge rod 13 in engagement with the work surface will be moving outwardly from the housing 82 until said rod reaches neutral adjusted position shown in the drawing, in which position the switch 50 will be horizontal, and the circuits of both coils 42 and 43 opened. When this neutral position is reached, the rotation of the shaft 27 will cease and the torch tip will again be at the adjusted distance from the work surface.

If the gauge rod should pass over a depression during the cutting movement of the torch 12, the rod will move outwardly from its housing 82, and the downwardly trailing movement of the thrust piece 86 will be transmitted to the switch 50 to cause said switch to tilt clockwise. This will close the circuit of the coil 43, and couple the gear 35 to the electro-magnet 40, so that the shaft 27 will rotate in a direction to lower the carriage section E and in turn the torch 12. This downward movement of the carriage section E will cause corresponding downward movement of the carriage section F and press the rod 13 inwardly into its housing 82, until the switch 50 is righted into horizontal position. The resultant opening of the circuits of the two coils 42 and 43 will stop the upward movement of the carriage section E, and the torch will again be in the adjusted position with respect to the work surface.

If the gauge rod 13 should inadvertently slip off the work sheet, the lever 78 will turn counter-clockwise to such an extent as to become disengaged from the lever 75. This will cause the lever 75 to immediately turn counter-clockwise under the action of the spring 77, until it reaches the stop 90, so that the switch 50 will be tilted counter-clockwise and the coil 42 energized. This will cause the carriage section E to move upwardly, so that the torch 12 is prevented from becoming damaged from impact with the work piece.

To effect reengagement of the two levers 75 and 78, the gauge rod 13 is lifted by hand until the pawl 80 slips into the V-shaped notch 81 of the lever 75.

As many changes could be made in the above construction, and many apparently widely different embodiments of this invention could be made without departing from the scope of the claims, it is intended that all matter contained in the above description or shown in the accompanying drawing shall be interpreted as illustrative and not in a limiting sense.

Having thus described our invention, what we claim as new and desire to secure by Letters Patent is:

1. A torch cutting apparatus including a torch, a gauge adjacent to the tip of said torch and adapted to ride over a work surface, said gauge being yieldably mounted for gauge movement with respect to said torch in accordance with the conformation of said surface, a motor, a transmission between said motor and said torch for moving said torch transversely of said surface, and including a reverse transmission unit, the setting of which determines the direction of transverse movement of said torch, and means operable in accordance with said gauge movement for setting said transmission unit in position to effect corresponding transverse movement of said torch, whereby said torch is spaced a constant predetermined distance from said work surface during cutting operations, irrespective of the contour of said surface.

2. A torch cutting apparatus including a torch adapted to travel over a work surface, a motor, a transmission between said motor and said torch for moving said torch transversely of said surface, and including a reverse transmission unit, the setting of which determines the direction of transverse movement of said torch, the drive through said transmission being automatically interrupted when the torch tip is at a predetermined distance from said surface, and means automatically operable upon a change in said predetermined distance for establishing said drive through said transmission, and for setting said reverse transmission unit in position to move said torch to said predetermined distance.

3. A torch cutting apparatus including a torch, a gauge adjacent to the tip of said torch, and movable with respect thereto in accordance with the conformation of a work surface, means operable in accordance with said gauge movement for effecting corresponding movement of said torch, to maintain said tip at a constant predetermined distance from said work surface during cutting operations, and means actuated by the movement of said gauge a predetermined distance transversely of and beyond said work surface, for preventing transverse movement of said torch toward said work surface.

4. A torch cutting apparatus including a torch, a gauge adjacent to the tip of said torch, and movable with respect thereto in accordance with the conformation of a work surface, means operable in accordance with said gauge movement for effecting corresponding movement of said torch, to maintain said tip at a constant predetermined distance from said work surface during cutting operations, and means actuated by the movement of said gauge a predetermined distance transversely of and beyond said work surface, for transversely moving said torch away from said surface.

5. A torch cutting apparatus including a torch, a gauge adjacent to the tip of said torch and adapted to ride over a work surface in yieldable engagement therewith, whereby said gauge is moved during cutting operations in accordance with the conformation of said surface, means operable in accordance with said gauge movement for effecting corresponding movement of said torch, to maintain said tip at a constant predetermined distance from said work surface during cutting operations, and means automatically operable when said gauge slips off said work surface, and moves beyond a predetermined distance with respect to said surface for preventing transverse movement of said torch towards said work surface, said last-mentioned means being inoperative as long as said gauge is riding over said surface.

6. A torch cutting apparatus including a torch, a gauge adjacent to the tip of said torch, and movable with respect thereto in accordance with the conformation of a work surface, said gauge being mounted for swinging movement about the axis of said tip, to permit cutting of work sheets which are narrower than the distance between said gauge and said torch tip, and means operable in accordance with said gauge movement for effecting corresponding movement of said torch transversely of said surface, to maintain said tip at a constant predetermined distance therefrom during cutting operations.

7. A torch cutting apparatus including a carriage having a section held against vertical movement, a second section supported on said first section, but movable substantially vertically with respect thereto, and a third section supported on said second section, an upright torch rigidly secured to said second section for vertical movement therewith, a gauge supported on said third section adjacent to the tip of said torch, and yieldably mounted for gauge movement axially with respect to said first and second sections in accordance with the conformation of a substantially horizontal surface, said third section being rotatably supported on said second section to permit swinging movement of said gauge about the axis of said torch, and means operable in accordance with said gauge movement for effecting corresponding vertical movement of said second section, to maintain said tip at a constant distance from said surface during cutting operations.

8. A torch cutting apparatus including a torch, a gauge rod adjacent to said torch and axially reciprocable with respect thereto, a member for guiding said rod in its axial movement, spring means for urging said gauge rod axially into engagement with a work surface, whereby said gauge rod is axially moved in accordance with the conformation of said surface, and means operable in accordance with the axial movement of said rod for effecting corresponding movement of said torch towards or away from said surface to maintain the torch tip at a constant distance from said surface during cutting operations.

9. A torch cutting apparatus including a carriage having a section held against vertical movement, a second section supported on said first section but movable substantially vertically with respect thereto, and a third section supported on said second section, an upright torch secured to said second section for vertical movement therewith, hand operable means for moving said second section substantially vertically with respect to said first section, hand operable means for adjusting the upright position of said torch with respect to said second section, a gauge supported on said third section adjacent to the tip of said torch, and yieldably mounted for gauge movement with respect to said first, second and third sections in accordance with the conformation of a substantially horizontal surface, said third section being rotatably supported on said second section to permit swinging movement of said gauge about the axis of said torch, and thereby permit cutting of work sheets which are narrower than the distance between said gauge and said torch tip, and means automatically operable in accordance with said gauge movement for effecting corresponding vertical movement of said second section to maintain said tip at a constant distance from said surface during cutting operations.

10. A torch cutting machine including a carriage having a section held against vertical movement, a second section supported on said first section but movable substantially vertically with respect thereto, an upright torch supported on said second section for vertical movement therewith, a gauge closely adjacent to the tip of said torch, supported on said second section for vertical movement therewith, and spring pressed for yieldable movement with respect to said second section, said gauge being adapted to ride over a work surface in yieldable engagement therewith, means for moving said second section vertically in accordance with the yieldable movement of said gauge with respect to said second section as said gauge rides over said work surface to maintain the torch tip at a constant predetermined distance from said work surface during cutting operations, and means actuated by the movement of said gauge downwardly beyond a predetermined position with respect to said second section for preventing downward movement of said second section and corresponding movement of said torch.

RICHARD BECHTLE.
ERICH HABERMEHL.